United States Patent
Bright et al.

[15] 3,684,964
[45] Aug. 15, 1972

[54] DECODING SYSTEM AND METHOD FOR GENERATING TIME SIGNALS

[72] Inventors: James A. Bright, Denver; Craig L. Wilson, Englewood, both of Colo.

[73] Assignee: Hathaway Instruments, Inc., Denver, Colo.

[22] Filed: Aug. 7, 1970

[21] Appl. No.: 61,983

[52] U.S. Cl...............325/58, 340/147 SY, 343/228
[51] Int. Cl..............................................H04b 1/16
[58] Field of Search............343/225, 228; 178/69.5; 340/147 SY; 325/67, 363, 364, 58; 58/35 W

[56] References Cited

UNITED STATES PATENTS

| | | | |
|---|---|---|---|
| 3,557,308 | 1/1971 | Sanford et al. | 178/69.5 |
| 3,217,258 | 11/1965 | Arlin et al. | 325/363 |
| 3,128,465 | 4/1964 | Brilliant | 343/225 |

*Primary Examiner*—Robert L. Griffin
*Assistant Examiner*—Kenneth W. Weinstein
*Attorney*—McGrew & Edwards

[57] ABSTRACT

A time code generating system and method; the system comprises a radio time signal decoder and a time code generator utilizing a highly stable frequency source for producing a time code indicating time of year in days, hours, minutes and seconds. The generating system is synchronized with the received time signal once each hour and once each minute by respective reset signals derived from the detected radio time signal.

8 Claims, 5 Drawing Figures

DECODING SYSTEM AND METHOD FOR GENERATING TIME SIGNALS

This invention relates to radio time code detecting and utilizing systems and particularly to an improved time code generator utilizing a highly stable frequency source.

Many control operations require accurate and stable time information in days, hours, minutes and seconds. For example, in the operation of power systems it becomes important to record events occurring in different and remote parts of the system in order that faults or irregularities in the system may be compared on a common time base. Highly accurate time signals are broadcast by the National Bureau of Standards radio stations, these signals are very useful and effective for their intended purposes. However, the difficulty of identifying a specific period of time increases as the length of the time period decreases, it being easy, for example, to determine the correct day and hour but relatively difficult to determine the minute and second information. By way of example, it is necessary for accurate evaluation of records of faults or disturbances in electric power systems that the times at the different recording stations be coordinated precisely for purposes of analysis.

It is an object of this invention to provide an improved method for utilizing radio time signals for producing highly accurate minutes and seconds indications.

It is another object of this invention to provide a highly accurate time code generating system for providing precise time information at a multiplicity of locations.

It is another object of this invention to provide a time code generating system utilizing broadcast time signals for facilitating the generation of precise time records concurrently at a multiplicity of stations.

It is a further object of this invention to provide a precise and accurate time code generating system for effecting the coordination of time at different remote locations in a power system or the like without the use of communication channels between the locations.

Briefly, in carrying out the objects of this invention in one embodiment thereof, a time code generating system is provided which includes a receiver for receiving and detecting a broadcast radio time signal, particularly that of the National Bureau of Standards station WWVB. Signal decoders provide signals at the beginning of each hour and at the beginning of each minute, and these signals are used to reset the minute and second signal produced by a highly accurate local time code generator. Thus the local generator is synchronized periodically with the broadcast signal and individual systems of this type located at distant points may be maintained in highly accurate synchronism.

The features of novelty which characterize this invention are pointed out with particularity in the claims annexed to and forming a part of this specification. The invention itself, however, both as to its organization and method of operation together with further objects and advantages thereof will be best understood by reference to the following description taken in connection with the accompanying drawings in which:

For purposes of illustration, a time code generating method and system embodying the invention are described herein which utilize the time signals broadcast by station WWVB of the United States Bureau of Standards located at Fort Collins, Colorado. Time code generating systems embodying the invention may, by way of example, be employed in an electric power system. In such power system, individual time code generating systems embodying the invention may be located at different remote control points or stations in the electric power system. In such application when each code generating system is operating to utilize the same broadcast time code signal, they will provide highly accurate time indications for records of line disturbances or faults occurring in the system so that the records at all of the different locations may be analyzed on the same precise time base.

Figure 1:
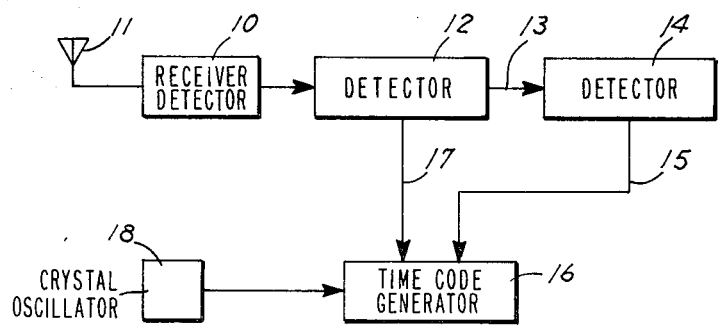
FIG. 1 is a block diagram of a system embodying the invention.

Referring now to the drawings, the decoder and time generator illustrated in FIG. 1 includes a receiver 10 having an antenna 11 for receiving and detecting the WWVB time code signals. The detected code signal is supplied to a detector 12 which provides an output signal indicating the beginning of each minute, this signal being supplied through an output indicated at 13 to a detector 14 which produces a signal pulse at the beginning of each hour and utilizes this pulse to provide a signal through an output indicated at 15 to a time code generator 16 to reset to zero the minutes indicator of the generator. The detector 12 also supplies a reset signal through an output 17 to the generator 16 at the beginning of each minute to reset to zero the seconds indicator of the time code generator.

The time code generator 16 is of the type which provides indications of the day, hour, minute and second of time. The day and hour may be preset and then the minutes and seconds indicators are synchronized with the broadcast signal by detectors 12 and 14 to provide accurate readings at the generator indicator.

The generator 16 is supplied with a signal at a frequency of one cycle per second, from a high stability crystal oscillator 18 which provides the time base for the generator 16. This oscillator is selected to have an accuracy of the order of 1 part in $10^7$ parts. Signals from the detectors 12 and 14 reset the seconds indicator of the generator 16 once each minute and reset the minutes indicator once each hour, thus synchronizing the code generator with the highly accurate WWVB broadcast time code signal. Highly accurate days, hours, minutes and seconds information is thus provided by the generator 16 without requiring extremely high fidelity detecting equipment for utilizing the broadcast code signals directly.

The high stability oscillator is employed to maintain the accuracy of the timing system between the reset pulses derived from the broadcast time signal. Time information flows through the time code generator from the "seconds" indicator toward the "days" indicator, and because the minutes and seconds indicators are controlled by the broadcast signal such as that of station WWVB, the days and hours indicators are also controlled; therefore, the entire time code generator indication is controlled by the broadcast WWVB code signal.

By employing code generators of the type indicated in FIG. 1 at several different locations in a power system, by way of example, it becomes possible to coordinate time measurements within, say, 3 milliseconds at the several different locations without utilizing direct communication channels between the locations.

Figure 2:
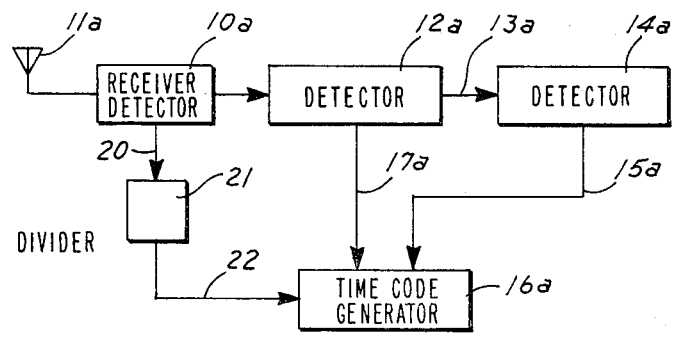
FIG. 2 is a block diagram similar to FIG. 1 showing a modification of the system.

FIG. 2 illustrates another embodiment of the invention. In this Fig. components essentially the same as those disclosed in FIG. 1 are employed and corresponding components have been designated by the same numerals with the suffix letter $a$. In the system of FIG. 2, the 60,000 cycle carrier wave of the WWVB broadcast signal is employed as a time base for the generator 16a. For this purpose, a carrier signal is supplied through an output 20 to a divider circuit 21 which supplies the time base signal to the generator 16a through an output 22. Thus, except for the source of the time base signal, the two systems of FIGS. 1 and 2 are essentially the same and operate in a similar manner.

Figure 3:
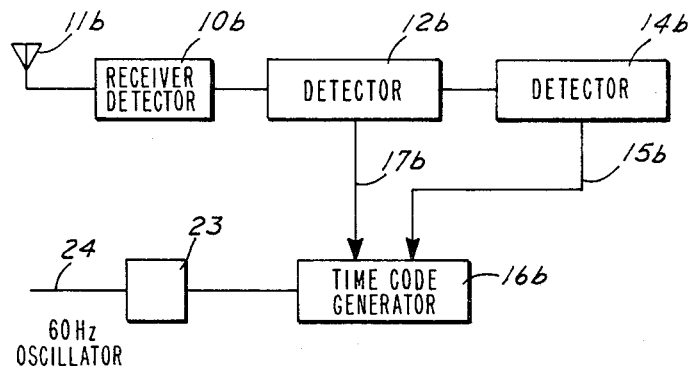
FIG. 3 is a block diagram similar to FIG. 1 showing another modification of the system.

FIG. 3 illustrates a further embodiment of the invention. In this figure, components essentially the same as those disclosed in FIG. 1 are employed and corresponding components have been designated by the same numerals with the suffix letter $b$. In this system a 60 cycle oscillator 23 is employed as a time base for the generator 16b, the oscillator is connected by a line 24 to the power system operating at 60 cycles and the oscillator is synchronized with the power line frequency. This method has the advantage of using a simple and inexpensive oscillator and may be found suitable for some applications; for example, it may be employed in a power system to provide synchronized time records in a plurality of interconnected locations all of which thus operate at the same controlled frequency of 60 cycles.

Figure 4:
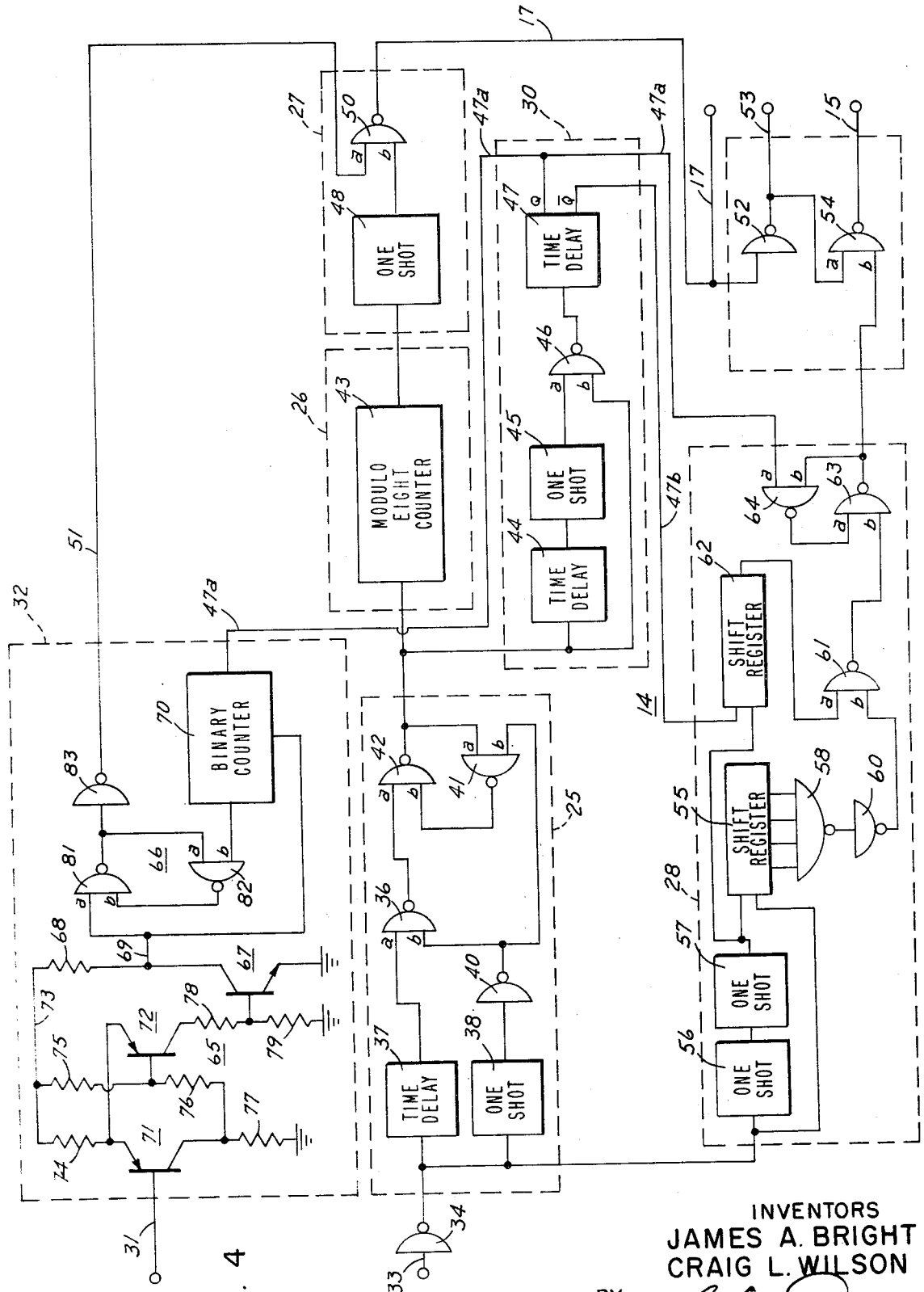
FIG. 4 is a schematic diagram of radio signal detecting and decoding circuits suitable for use in the systems of FIGS. 1, 2 and 3.

The detectors for generating the minute and second reset signals are illustrated in further detail in FIG. 4. The minute detector 12 is illustrated as comprising a reference marker detector 25, a reference marker counter 26 and the reset signal generator 27. The detector 14 is illustrated as comprising an end of hour detector 28 and an initial reference marker detector which also functions as part of the detector 12. The two input connections from the receiver 10 are illustrated, the first a lead 31 to a carrier detector 32 and the second, a lead 33 to an inverter 34 to provide the input to the reference marker detector 25.

Figure 5:
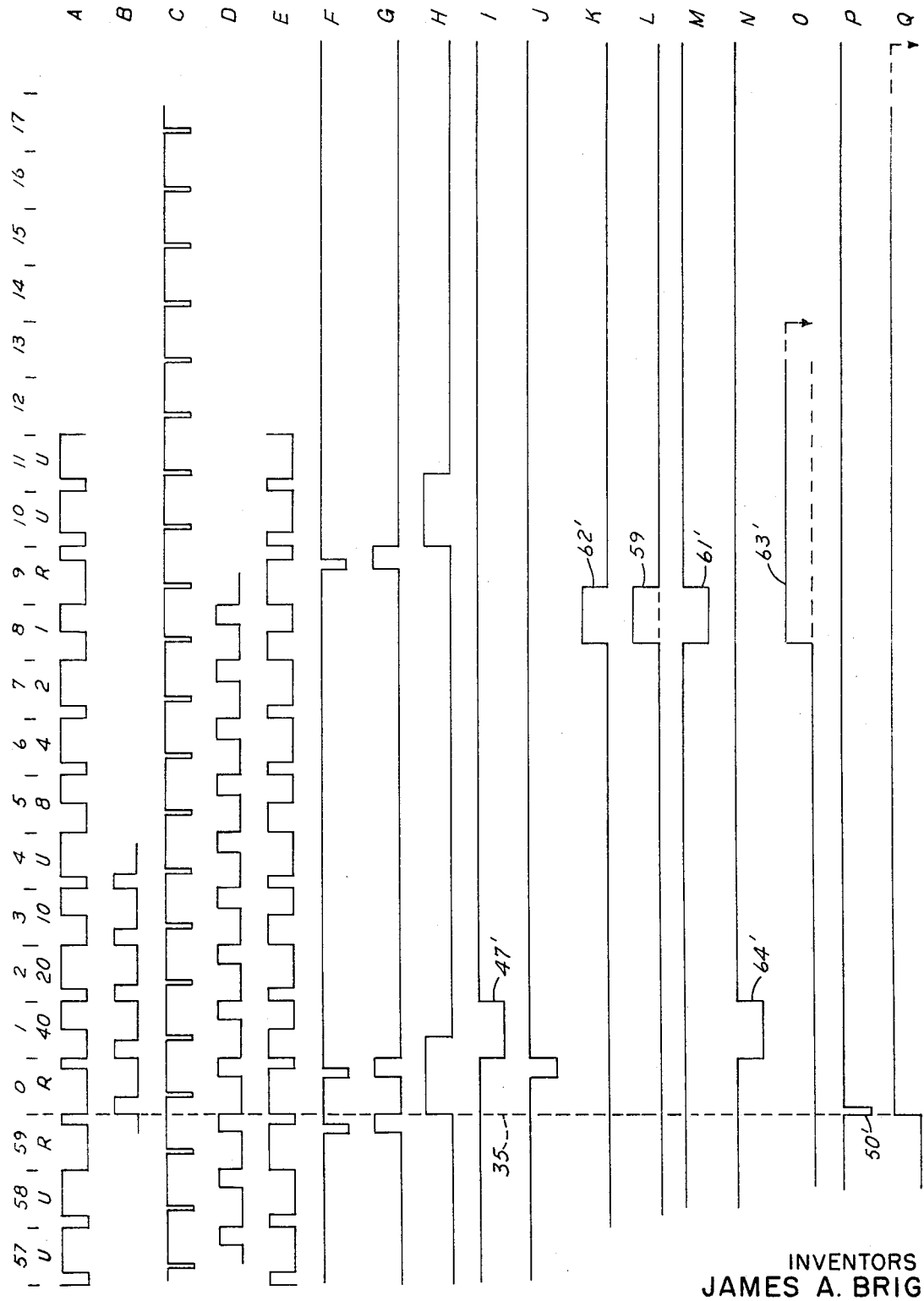
FIG. 5 is a set of curves illustrating the characteristics of the system of the invention.

FIG. 5 comprises characteristic curves of the system and is useful in understanding the manner of operation of the system as shown in FIG. 4. The WWVB time code signal is illustrated as curve "A" in FIG. 5. The end of the hour is indicated as the end of the fifty ninth minute, the interval between the reference time and the end of the first minute being designated the zero minute; the seconds are designated in the same manner. A scale of one second markers is provided immediately above the curve "A" and the reference time is indicated near the left-hand end of the curves of FIG. 5 by a vertical line 35. The broadcast code as shown in curve "A" is utilized to provide binary code signals.

The code provides a negative transition at the beginning of each second and the binary zero indication is made by a positive transition at 0.2 second and a binary "1" indication by a positive transition at 0.5 second. Reference markers for timing purposes are given by positive transitions at 0.8 second. In the code as indicated, unused cycles are indicated by the letter "U" and reference markers by the letter "R". A portion of the code illustrated to the right of the reference time line 35 gives the binary code signals for the fifty ninth or last minute of the hour, the first minute being considered the zero minute as stated before. The minute is identified by the code given in the first ten seconds of each minute, the value assigned to each bit as indicated on the curve is 40 for the second numbered "1", 10 for the second numbered "3", 8 for the second numbered "5" and 1 for the second numbered "8", providing a total of fifty nine.

It will be noted that two reference markers or pulses are provided, one on either side of the reference time, the second of these being the marker for minutes, and that the second reference markers recur as single markers at the end of each ten seconds throughout the remainder of the minute. The wave or pulse curve "A" is inverted by the inverter 34 and supplied to the detector 25 in the form shown as wave "E" in FIG. 5. The input wave is impressed on the upper or $a$ input of a NAND gate 36 after passing through a time delay element 37 which delays the signal for a period of the order of one microsecond. The signal is also impressed on the input of a one shot multivibrator 38 which is triggered on each positive transition of the inverted input wave and produces a low or negative signal for 0.65 second beginning at the start of each second of the wave. This signal is supplied to the $b$ input terminal of the gate 36 through an inverter 40 and is also impressed on the $b$ input terminal of a NAND gate 41, the output of the gate 36 is impressed on the $a$ input of a NAND gate 42 and the output of this gate is impressed on the $a$ terminal of the gate 41 and is supplied to a modulo eight counter 43 of the reference marker counter 26. The output of the gate 41 is supplied to the $b$ terminal of the gate 42. The NAND logic gates 36, 40, 41 and 42 have the characteristic that the output is low only if both inputs are high, thus if either or both of the inputs is low, the output will be high. The inverted output of the one shot 38 provided by the inverter 40 and impressed on the $b$ inputs of the gates 36 and 41 is shown as the curve "D" in FIG. 5. It will now be seen that at the beginning of each minute, when the time reference signals occur, both the curves "D" and "E" are high at the same time for a short interval terminating with the negative going transition of the curve "E"; as a result, the output of the gate 36 is a short negative going pulse each time the reference time signal occurs, these low or negative pulses are indicated on the curve "F" in FIG. 5. In the absence of two high inputs, the output of gate 42 is high and thus the input "A" of gate 41 is high, the input $b$ of gate 41 is low until the positive going transition of the curve $d$, whereupon the output of the gate 41 will be low and until the next positive transition of curve "E" of FIG. 5, one or both inputs will be low and the output of gate 42 high. The output of the gate 42 will thus provide the timing pulses indicated by the curve "G" — two reference pulses, one at the end of the minute and, one at the end of the first second followed by one reference pulse at the end of each tenth second.

The output represented by the curve "G" is impressed on the modulo eight counter 43 of the marker counter 26 and on an invert and delay circuit 44 of the first reference marker detector 30 which supplied the signal with the delay of about 50 nanoseconds to a one shot multivibrator 45 which produces a high or positive pulse of 1.3 seconds duration upon each negative transition of the reference markers of curve "G" with the exception of the marker at the end of the first or "zero" second which occurs during the 1.3 second pulse initiated by the marker at the end of the last second of the preceding minute indicated as the fifty ninth second. The output of the one shot 45, indicated in FIG. 5 as curve "H", is supplied to the a input of a gate 46 and the output of the gate 42 (curve "G") is supplied to the b input terminal of the gate 46. It will now be noted that when the pulse at the end of the zero or first second occurs, both terminals of the gate 46 are high and the output is therefore low as indicated by the curve "J" of FIG. 5. Thus, the beginning of the minute is identified by a positive pulse or high occurring 0.65 second after the zero reference time. The output of the gate 46 is impressed on a one shot multivibrator 47 having an upper or "Q" output and a lower or "Q-bar" output. The multivibrator 47 has a time delay of 0.85 second and its "Q" output is a negative going pulse 47' initiated by the positive transition of the curve "J" and is indicated on the curve "I". The pulse 47' is supplied through a line 47a to the modulo eight counter 43 to reset the counter upon the termination of the pulse of the curve "G" which occurs at the end of the first or "zero" second, the counter 43 then counts the six remaining reference marker pulses, the last of which occurs at the end of the minute. Upon completion of the count, the counter supplies an output signal to a one shot multivibrator 48 of the reset signal generator 27. This output signal is shown on curve "Q" of FIG. 5 and continues until the twentieth second as determined by the counter. The one shot 48 supplies a positive going or high output signal having a duration of about 10 microseconds to the b input of a gate 50, the a input of which is connected by a line 51 to receive a steady high or positive signal from the carrier detector 32 during normal operation as long as the carrier wave is present. The gate 50 thereupon produces a negative going output pulse which is the reset signal for the seconds indicator of the generator 16 and is indicated at 50' on curve "P" of FIG. 5. The reset signal is thus applied to the time code generator line 17 to reset the seconds indicator once each minute to assure synchronism with the seconds information of the broadcast code signal.

The reset signal is also supplied to an inverter 52 which supplies a pulse to a time base disabling circuit through a lead 53, this signal interrupting operation of the time base generator 18 during the resetting of the generator 16. The output of the inverter is also supplied to the a input of a gate 54, this being the gate for applying the minutes reset signal to the line 15.

In order to provide a minutes reset signal, the time code input signal represented by the curve "E" is supplied to the detector 28 which includes an eight bit shift register 55.

The input signal of curve "E" is applied to a one shot multivibrator 56 of the detector 28; this one shot has a delay of 0.35 second and produces a positive going pulse of this duration beginning with each positive transition of the input signal curve "E", these pulses, which are indicated on the curve "B" of FIG. 5, are supplied to a one shot multivibrator 57 which has a time period of 200 nanoseconds and produces a low or negative going short pulse once each second. The one shot 57 thus acts as a clock and produces signals at intervals of one second as indicated by the curve "C" of FIG. 5.

The input signal of curve "E" is also supplied to the input of register 55 and each time that the one second signal of the curve "C" coincides with a high in the curve "E", the input is registered. Register 55 has four outputs as illustrated which are the inputs of a gate 58 having a normally high output. The output of the gate 58 is a negative pulse only upon the coincidence of the inputs representing highs of the coded signal corresponding to the binary code contained in the time signal for the first ten seconds of the fifty ninth minute and represented by the coded numbers 1, 8, 10 and 40, respectively. This last minute of the hour is the only minute during which the code provides the required output and thus the gate 58 produces a pulse, only once each hour; this pulse is negative and is supplied to an inverter 60 so that a high or positive going pulse, indicated at 59 on curve "L", is supplied to the b input of a NAND gate 61. The a input of the gate 61 is connected to the output of an eight bit shift register 62 which receives an input signal from the lower or "Q-bar" terminal of the one shot multivibrator 47 through a line 47b once each minute, this signal being the same as the pulse of curve "I" but inverted. The negative going pulses constituting the clock signals of the curve "C" are also supplied to the register 62 and each time that a clock signal occurs during one of the pulses of the one shot 47, the register is shifted and on the eighth such pulse a high or positive going pulse 62', on curve "K", appears on the shift register output and is supplied to the a input of the gate 61. The output of the gate 61 remains high except when the fifty ninth minute signal of curve "E" appears at the same time as the register 62 output whereupon the a and b inputs of the gate 61 are both high and a low or negative going pulse appears at the output of the gate. This is the set input signal, appearing as a pulse 61' on curve "M", and is supplied to the b input of a NAND gate 63, the a input of which is connected to the output of a NAND gate 64 having its a input connected to the "Q" output terminal of the one shot 47 through the line 47a. The b input of the gate 64 is connected to the output of the gate 63. The b input of the gate 63 is normally high as is the a input and the output of the gate 63 is thus normally low. The a input of the gate 64 is normally high and receives a low or negative going pulse input once each minute which is indicated at 64' on curve "N" of FIG. 5, the same as pulse 47' on curve "I". The low signal 61' of the curve "M" which occurs once each hour at the output of the gate 61 is impressed on the b input of the gate 63 and the output of this gate then becomes high, as indicated by the high portion 63' of the curve "O" and remains high until the next reset input pulse 64' of curve "N".

The reset pulse 50' which is applied to the input a of the gate 54 during the high portion 63' of the curve "O" produces a minutes reset pulse on the line 15 at the output of the gate 54 and resets the minutes indicator of the time code generator 16. The minutes indicator of the generator is thus reset once each hour to assure synchronism with the minutes time signal of the broadcast code signal.

Should the carrier wave not be present at the detector 32, the absence of the positive or high signal at input *a* of the gate 50 disables the gate as indicated above. This control is accomplished by the circuits of the detector 32 which, as shown in FIG. 4, include a Schmitt trigger 65 and a flip-flop 66. The Schmitt trigger output is supplied to an NPN transistor 67 connected in series with a resistance 68 to provide a low or logic level output through connection 69 to the flip-flop 66 and also to a counter 70. The Schmitt trigger receives a steady D.C. input or AVC signal from the radio receiver and detector and as long as this signal is present, a high or positive signal is present on the line 51 and thus maintains the "A" input of the gate 50 in the high condition.

The Schmitt trigger 65 employs two PNP transistors 71 and 72 connected between a positive voltage supply line 73 and ground. A bias resistance 74 is connected between the line 73 and the emitter electrodes of the transistors, and a voltage divider comprising resistances 75, 76 and 77 provides the bias for the base electrode of the transistor 72. The collector output of the transistor 72 is connected through a voltage divider comprising the resistances 78 and 79 to the base of the transistor 67.

The flip-flop 66 comprises two gates 81 and 82 and supplies a low or negative output to an inverter 83 to provide the required signal on the line 51. Should the carrier wave be interrupted, it is desirable to provide a delay before normal operation of the system is resumed and for this purpose the counter 70 is provided to delay the resumption of the normal high signal on the line 51 until two full minutes of the transmitted signal have been received. Counter 70 is a binary counter and has an input connected to the line 47*a* to receive the pulse 47' from the multivibrator 47. This pulse occurs once in each minute and the counter supplies a negative or low signal to the input of the gate 82 upon receiving three of the pulses 47' whereupon the flip-flop reverses and the negative or low signal appears at the output of the gate 81 and is converted to the high signal by the inverter 83.

The precise timing of the reset signals obtained through operation of the minute and hour detector circuits of FIG. 4 provides a simple and effective arrangement for utilizing the standard time signals for precise timing of the second and minute indications of the generator 16 while utilizing the local high stability source such as the generator 18 to assure precise timing of the seconds and minutes in the intervals between the minute and hour signals of the broadcast radio time code.

When a plurality of time code generators as disclosed above are provided at remote locations such as on a power system, for example, all of the units will be synchronized by the broadcast code signal so that the day, hour, minute, and second times are precisely the same at all stations. The local high stability oscillator assures that in the time intervals between the reset signals all of the stations will provide the same time information. Thus, records produced at these locations are coordinated within a very high degree of accuracy and are not dependent upon complicated and costly receiving and detecting equipment of sufficient fidelity to insure the necessary high accuracy of the minute and second signals at the plurality of different stations. Furthermore, in the event that the broadcast signal is interrupted the time code generators provided at the separate stations will remain in essential synchronism for a substantial period because of the high stability characteristics of the independent timing sources at the local stations.

We claim:

1. A time code generating system utilizing a standard radio time signal of the type providing time of year information in days and hours and minutes for generating a highly accurate time indication, comprising means for receiving and detecting a radio time code including minute reference marker signals, means for detecting the beginning of each minute of the code, time code generating means including a highly stable frequency source constituting a time base for generating a time code providing indication of time in days, hours, minutes and seconds, and means utilizing said beginning of minute detector for resetting the seconds indication of said time code generating means to a predetermined reference second indication once during each minute for effecting synchronization with the received radio signal.

2. A code generating system as set forth in claim 1 wherein said receiving and detecting means also includes means for receiving and detecting a radio time code having hour information and including means utilizing said hour information for detecting the beginning of each hour of the code, and means utilizing said beginning of hour detector for resetting the minutes indication of said time code generating means with said radio signal once during each hour.

3. A code generating system as set forth in claim 2 wherein the standard code further comprises binary code information in the last minute of each hour and wherein said utilizing means comprises a binary counter and means including said beginning of minute detector for generating a reset signal for said time code generating means at the beginning of each minute.

4. A time code generating system as set forth in claim 1 wherein the standard code comprises minute reference markers at the end of the first second and at the respective end of each ten seconds of each minute whereby two adjacent markers occur at the beginning of each minute, and wherein said utilizing means comprises a modulo eight counter and means for resetting said counter to two upon the occurrence of said marker at the end of said first second, and means for generating a reset signal upon the count of eight at the end of each minute.

5. A code generating system as set forth in claim 3 wherein said standard code further comprises binary code information in the last minute of each hour and wherein said utilizing means comprises a binary counter and means including said beginning of minute detector for generating a reset signal for said time code generating means at the beginning of each minute.

6. In a time code generating system utilizing a standard radio time signal of the type providing time of year information in days and hours and minutes, the method of generating a highly accurate time indication which comprises
   receiving and detecting the radio time code signal,
   detecting the beginning of each minute of the time signal,
   providing a time code generating means for indicating time in days, hours, minutes and seconds, and
   utilizing the detected beginning of minute signal for periodically resetting the seconds indication of the code generating means for effecting synchronization with the received radio signal.

7. The method of generating a highly accurate time indication as set forth in claim 6, including the step of detecting the beginning of each hour of the time signal, and
   utilizing each detected beginning of hour signal for resetting the minutes indication of the time code generating means once during each selected period for effecting synchronization with the received radio signals.

8. The method of generating a highly accurate time indication as set forth in claim 7 wherein the step of resetting the seconds indication of the code generating means with the received radio signal is effected once each minute.

* * * * *